Figure 1:
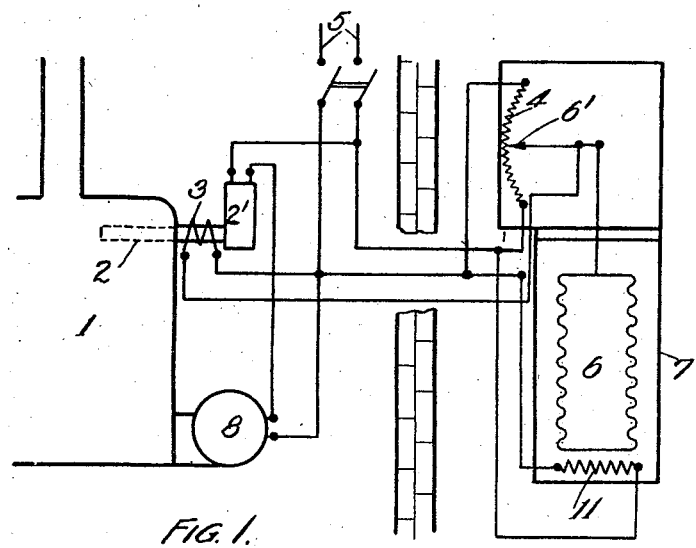

Patented Apr. 6, 1943

2,315,984

UNITED STATES PATENT OFFICE 2,315,984

TEMPERATURE REGULATOR

Leonard Satchwell, Slough, England

Application January 20, 1940, Serial No. 314,848
In Great Britain January 31, 1939

1 Claim. (Cl. 236—91)

This invention relates to temperature controlling devices for the maintenance of an even temperature in an enclosed space by the automatic variation of the temperature of the heating medium so as to compensate for the variation of heat losses from the space consequent on variation of weather conditions outside the enclosed space.

A hot water central heating installation is an example of a heating system in which the heat input to the rooms can be varied by alteration of the temperature of the heating medium, e. g. the circulated hot water. If therefore the temperature of the water circulated be regulated to be high when outside temperature is low and vice versa, then compensation for variation of heat loss will be obtained, resulting, if the compensation be correctly proportioned, in the maintenance of steady temperature in the room.

In a controlled heating installation it is usual to provide a thermostat in the heater, boiler or other heat distributing device such as will turn on or off or regulate the combustion means which is the primary source of the heat. Such a thermostat is normally provided with a lever for adjustment to allow the temperature of operation to be selected. It has been proposed in such a thermostat to obtain the equivalent of changing the thermostat setting by providing the thermostat with an electrical resistance element to provide an auxiliary source of heat in addition to the heat derived from the heater which it is controlling so that such resistance element may supply a continually varying quantity of heat to the thermostat by the intermittent switching on and off of a fixed amount of energy, the switching cycle being controlled in an inverse ratio to the outside temperature.

It has also been proposed to provide in a temperature control system a thermostat responsive to changes of the outside temperature, though protected from the sunlight or moisture conditions, and adapted to move a contact arm over a series of contacts controlling the supply of heating current to a second thermostat located in the room the temperature of which is to be controlled so that the said room thermostat will operate at lower or higher room temperature to cut off the supply of heat to the room.

It has further been proposed in central heating plants to control the boiler temperature in relation to the outside temperature by regulating the size of the flame by the insertion of regulating resistances in the circuit of the motor driving the oil pump and air blower by means of an outside thermostat.

In accordance with the present invention the temperature of a heating medium is varied consequent on variation of weather conditions by electrical means such as a rheostat, a variable choke coil, or a variable ratio transformer, such electrical means being operated by a thermally sensitive member exposed to the weather conditions, the electrical means being arranged to regulate continuously an auxiliary supply of heat to a thermostat controlling the boiler temperature.

This latter thermostat may be of the type in which the movement of the thermally sensitive element operates a switch to turn off or on or regulate the heating means, or the thermostat may be of the type in which the expansion means, usually comprising a dilatable vessel filled with a liquid is mechanically coupled to a damper or dampers adapted to be moved to shut, open or to intermediate positions within a certain number of temperature degrees change so as to control the boiler water temperature to a substantially constant value within the limits of change necessary to move the damper or dampers.

Suitably, the thermostat exposed to weather conditions is mounted in a heated container the temperature of which is governed by the weather conditions.

Several embodiments of the present invention are illustrated diagrammatically by way of example in Figs. 1 to 5 of the accompanying drawings.

Figure 2:
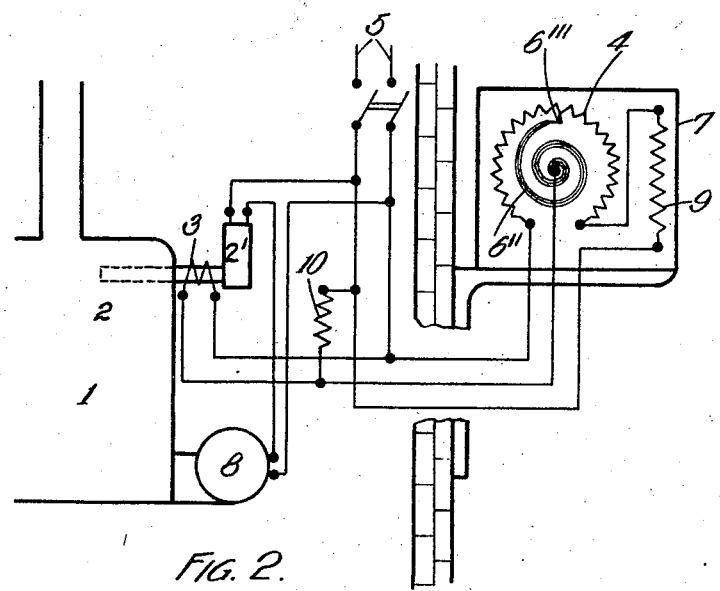
Figure 3:
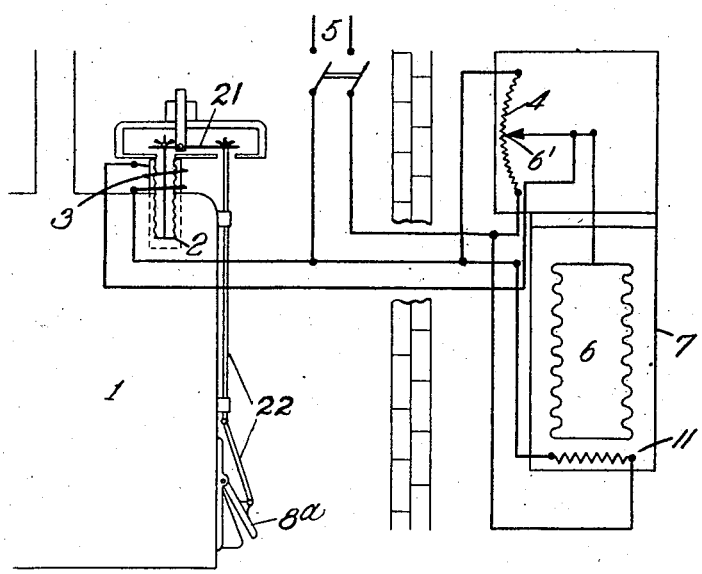

Referring to the drawings, 1 denotes the boiler or heater which is the source of supply of heat or the heating medium to the enclosed space, while 2 denotes the thermostat in the boiler controlling the water temperature. A heating resistance 3 surrounds a part of the thermal element of the boiler thermostat 2 so as to affect the thermostat conjointly with the boiler water temperature. In Figs. 1 to 3 of the drawings the resistance 3 is controlled by a rheostat 4 which is supplied with current from a suitable source 5. 6 denotes a thermostat located in the outside atmosphere preferably in a container 7. In Figs. 1 and 3 the thermostat 6 serves to operate a contact 6' on the rheostat 4, and in Fig. 2 the thermostat 6'' operates the contact 6''' on the rheostat 4.

A resistance 11 is arranged to take a small fixed amount of energy from the supply 5 and is disposed within the container 7 so as to maintain the container 7 at a temperature above that of the outside atmosphere.

The thermostat 2 may control the water temperature in the arrangement of Figs. 1, 2, 4 and 5 by switching on or off the switch 2' to regulate the combustion means 8, or in the arrangement of Fig. 3 the thermostat 2 may actuate the lever 21 and rods 22 to regulate the damper 8a and control the supply of air to the furnace.

If the thermostat 2 be arranged to control the boiler 1 at a temperature of say 170° F. additional heating of the thermostat 2, as a result of a current passing around the auxiliary resistance coil 3, will regulate the combustion means 8 or the damper 8a to reduce the rate of combustion and therefore to lower the water temperature. If the current passing in coil 3 be increased then still further reduction of boiler water temperature will result. The operation as described is brought about by the thermostat 6 exposed to the outside temperature moving in accordance with change in temperature and so altering the continually variable rheostat 4, and in the manner explained, changing the temperature of the boiler water in an inverse ratio to the outside temperature.

If the container 7 be subject to wind or rain the heat loss from the container 7 will be greater and the internal temperature lower than it would be with the same external temperature without wind or rain. Such variation of weather conditions will, of course, affect the heat loss from a building in a similar manner and therefore the position of the contacts 6' and 6''' on the rheostat 4 will enable continuous adjustment to be made automatically to the boiler water temperature to compensate for the variation of losses from the building with changing weather conditions. In order that the temperature inside the heated container 7 may bear a true relation to weather conditions it is necessary that the electrical input be maintained substantially constant. Two methods of accomplishing this are shown in the drawings. In Figs. 1 and 3 a resistance 11 is arranged to take a constant load from the supply and the thermal element container 7 is separated from a container in which the rheostat 4 is mounted so that the variation of watts in the rheostat consequent on movement of the contact arm 6' does not affect the thermal element.

In Fig. 2 resistances 9 and 10 are included in the circuit of the rheostat 4 and boiler thermostat heating resistance 3, connected so that variation of heating energy in the rheostat 4, consequent on movement of the thermostat 6, is compensated for by the change of energy in the resistance 9 so as to maintain the total heating energy in the container 7 practically constant, thus simplifying the arrangement of thermostat and rheostat.

In Fig. 3 much of the electrical heating supplied by the coil 3 would be lost to the body of the boiler by conduction through the thermostat 2. The electrical heater would therefore preferably be applied to a separate vessel in hydraulic connection with the boiler control thermostat 2 or a separate dilatable vessel, filled with a liquid and fitted with an electric heating winding, may be connected in mechanical series with the transmission between the thermostat 2 and the damper or air inlet door 8a.

Figure 4:
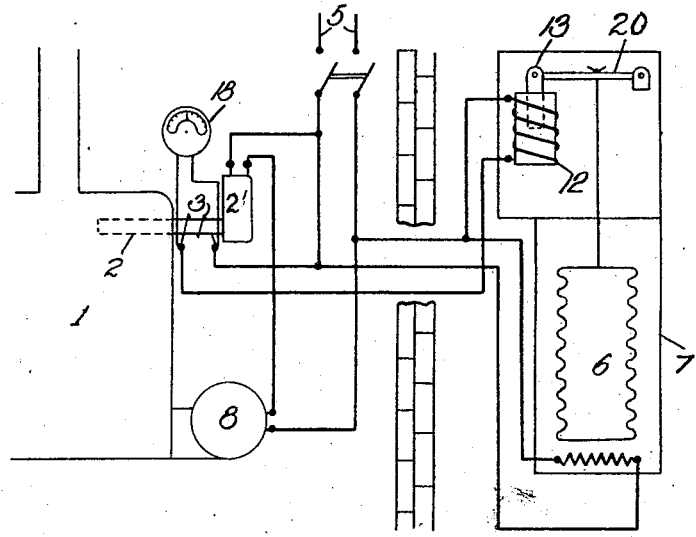
Figure 5:
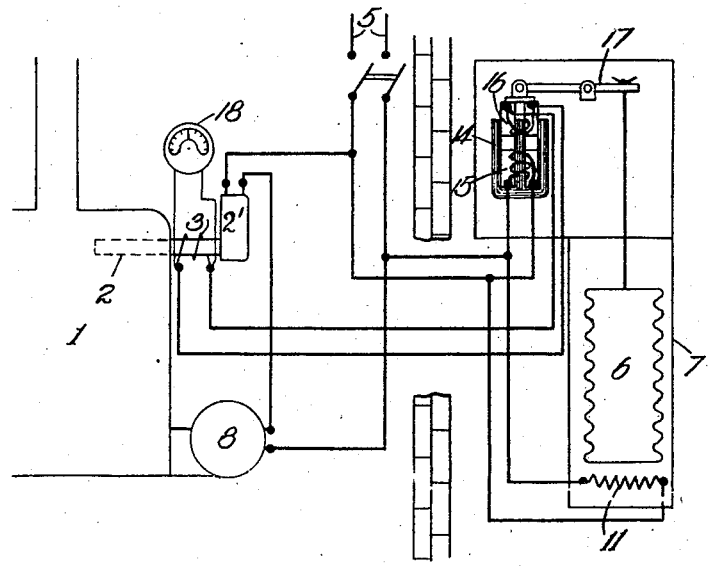

The embodiments shown in Figs. 4 and 5 are utilised for alternating current circuits. In Fig. 4 the rheostat 4 shown in Figs. 1 and 3 is replaced by a choke coil 12 which is supplied with current from a suitable source 5. The thermostat 6 is located in the outside atmosphere preferably in a container 7 and serves to operate through a lever arm 20 the movable iron core 13 of the choke coil 12 which is connected in series with the heating resistance 3 for supplying additional heat to the boiler thermostat 2.

In operation of the apparatus as the outside temperature falls the thermal expansion member 6 will contract, drawing the iron core 13 into the coil. This action by increasing the impedance of the circuit 5, 3, 12 will reduce the current flowing in it. This reduction of heating current in the heating coil 3 will necessitate a higher water temperature in the boiler surrounding the thermostat to bring it to the operating point. A fall of outside temperature will therefore by the action of the thermally sensitive member exposed to weather conditions and working in conjunction with the boiler thermostat be accompanied by an increase of boiler water temperature.

In the arrangement shown in Fig. 5 the simple choke coil 12 shown in Fig. 4 is replaced by a transformer 14 in which coil 15 is energised from the alternating current supply 5 and coil 16 carried on a movable bar 17 moved by the thermally sensitive member 6. The electric heater 3 surrounding the stem of the boiler thermostat 2 is connected across the movable coil 16 and receives its supply from it.

As the outside temperature falls the thermally sensitive member 6 contracts and operates lever 17 separating coil 16 from the energised coil 15 and thus reducing the voltage induced in coil 16 and therefore reducing the additional heating applied to the boiler thermostat 2 by the coil 3. This reduction of electric heat applied to the boiler thermostat in turn requires an increase of boiler water temperature to operate the boiler thermostat.

The rheostat 4 of Figs. 1, 2 and 3, the choke coil 12 of Fig. 4 and the transformer of Fig. 5 comprise controllers for varying the heating of the resistance 3.

It will be seen that in this invention as described in the foregoing description of the various embodiments the voltage applied to the electric heater 3 on the boiler control thermostat is made to vary by an amount which is proportional to the outside weather variation taking into account the effect of sunshine, rain or windage losses.

An electric indicator 18 may as shown be connected across the heater and arranged to give readings, the numerical value of which will be proportional to the effective outside temperature.

It is to be understood that the invention is not limited to the forms of the thermostat shown. Neither is the invention limited to the arrangements of the resistances indicated.

I claim:

Apparatus for varying the temperature of a heating medium consequent on variation of weather conditions comprising a thermostat sensitive to and controlling the temperature of the heating medium, an auxiliary electric heating device in thermal contact with said thermostat, a thermally sensitive member in a container having walls exposed to weather conditions, an electric heating means for introducing heat into said container at a constant and substantially uniform rate, and electrical control means operated by said thermally sensitive member for gradually increasing or decreasing the supply of heat from said auxiliary heating device to said thermostat, whereby a continually varying quantity of heat is supplied to the thermostat as the outside temperature changes.

LEONARD SATCHWELL.